Sept. 9, 1969  S. C. PEEK  3,466,500

CONTROL CIRCUIT FOR ARC DISCHARGE DEVICE

Filed Dec. 29, 1967  2 Sheets-Sheet 1

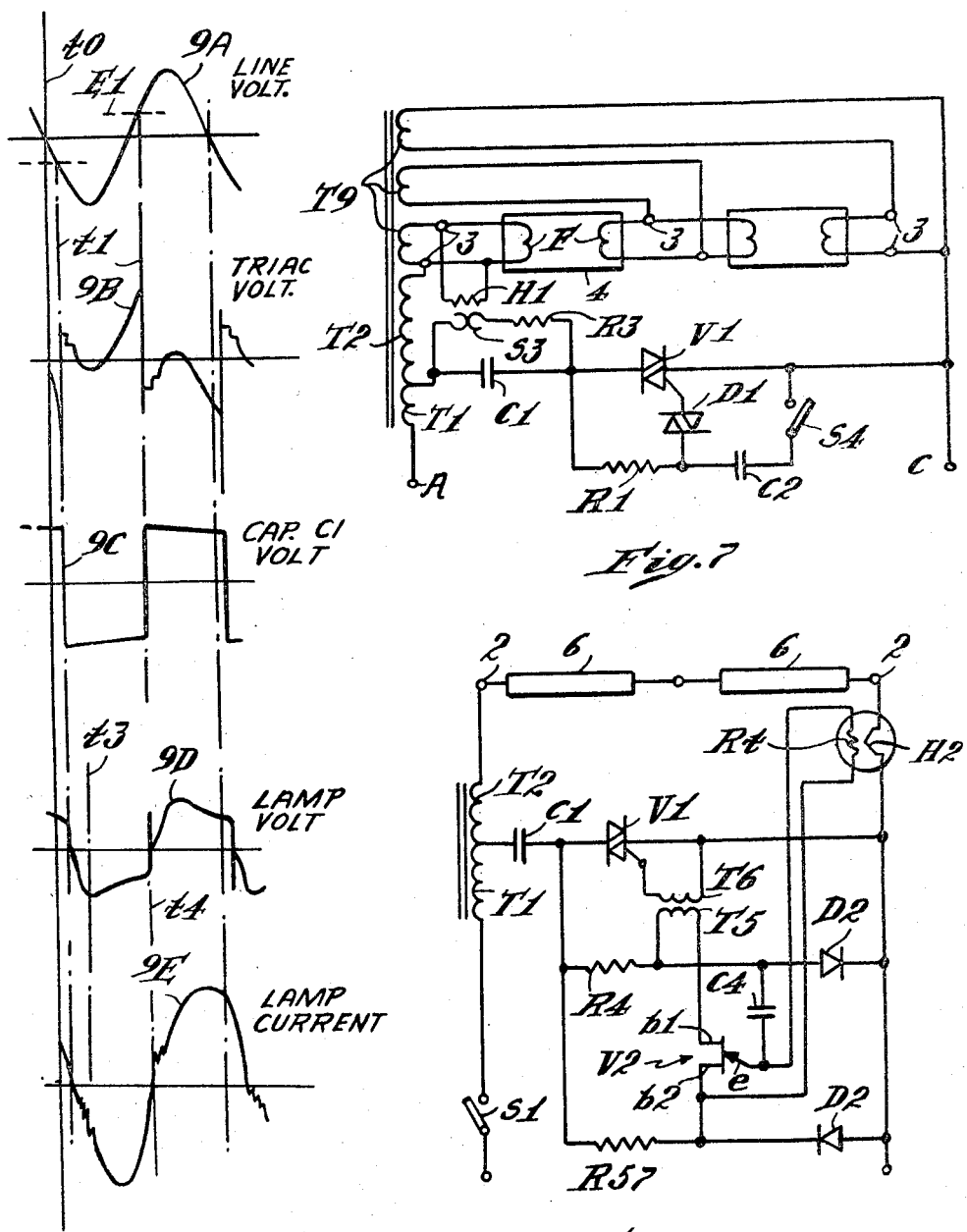

United States Patent Office 3,466,500
Patented Sept. 9, 1969

3,466,500
CONTROL CIRCUIT FOR ARC
DISCHARGE DEVICE
Sandford C. Peek, Ipswich, Mass., assignor to Sylvania
Electric Products Inc., a corporation of Delaware
Continuation-in-part of application Ser. No. 606,669,
Jan. 3, 1967. This application Dec. 29, 1967, Ser.
No. 704,498
Int. Cl. H05b 39/04, 41/36
U.S. Cl. 315—100                                    13 Claims

ABSTRACT OF THE DISCLOSURE

A semiconductor circuit for discharging a stored starting charge through a negative resistance fluorescent lamp and limiting current through the lamp in operation.

---

Figure 1:
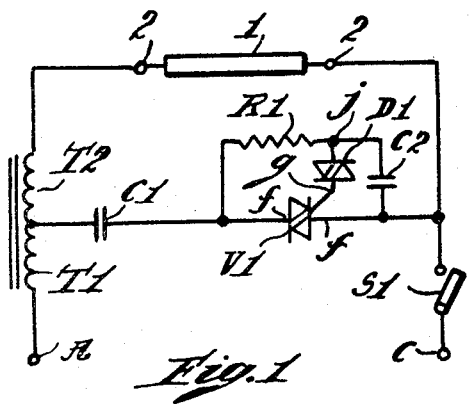

This is a continuation-in-part of my copending United States patent application Ser. No. 606,669, filed Jan. 3, 1967, now abandoned.

The starting and operation of arc discharge devices such as fluorescent lamps and high pressure mercury lamps presents two major problems. First, these and similar devices require a relatively high voltage to ignite an arc across the lamp as compared with the voltage needed to maintain the arc once it is ignited. Secondly, once the arc is ignited it has a negative resistance characteristic causing it to tend to draw increasingly more current until it reaches a runaway condition. Both problems have been solved by the use of an inductive ballast in series with the lamp and the line terminals supplying power to the lamp. The voltage applied across the lamp by the ballast is adequate to maintain an ignited arc. The ballast steps up or gives an inductive kick to the voltage, producing peak voltages above the line peak voltage and adequate to strike the arc. The reactance of the ballast then limits the current through the lamp to its rated value. The objections to the use of ballasts are that they are heavy and bulky by reason of the large amount of copper winding and iron core in their construction. They are expensive to make and draw substantial power not useful for lighting. They heat the environment of the lamp, and unless carefully constructed generate acoustic and electromagnetic noise.

Accordingly it is the object of the present invention to provide an arc discharge control circuit which eliminates or minimizes inductive ballasting, and yet which provides an arc starting voltage from a power line of lower than arc starting voltage, and limits current through an ignited device preventing runaway.

According to the invention an electrical system for continuously controlling operation of a negative resistance ionized arc discharge device comprises discharge terminals for connection to each end of the device, power terminals for connection to a supply of alternating voltage less than said predetermined arc maintaining level, a power circuit connecting said power terminals to said discharge terminals, a voltage pulse generating circuit connected in parallel with said discharge terminals, means coupling said circuits, said generating circuit being responsive to said alternating voltage once each half cycle of alternation to apply a voltage pulse through said coupling means to said discharge terminals of amplitude to produce ionization in the device adequate to support substantially one-half cycle of conduction, thereby to start an arc discharge by ionization in said device and to draw current from said alternating voltage supply, and said generating circuit including means to limit the energy of each voltage pulse to less than that required to ionize the device through successive half cycles, whereby the arc tends to extinguish and is reionized each half cycle thereby to limit current through the device without the use of a ballast.

For the purpose of illustration typical embodiments of the invention are shown in the accompanying drawing in which:

FIGS. 1 to 8 are schematic diagrams of control circuits for fluorescent lamps; and FIG. 9 shows voltage and current waveforms in the circuit of FIG. 1.

The exemplary circuit of FIG. 1 comprises a sixty watt, high output fluorescent lamp 1 having discharge terminals 2. Such a lamp typically has a rated starting voltage of 240 volts peak and an arc maintaining voltage of 60 volts RMS. Power is supplied to one lamp terminal 2 from one 115 volt line terminal A through an autotransformer having a primary winding T1 and a secondary winding T2 with a turns ratio of 1 to 10. The other lamp terminal 2 is connected through a manual switch S1 to the other line terminal C. The system so far described comprises the power or operating circuit for the lamp. Connected in parallel with the lamp is a voltage pulse generating circuit comprising a primary voltage pulse storage capacitor C1 (6 microfarads) and a bilateral controlled electron valve V1, known as a triac (G.E., type SC45B). A triac is triggered into avalanche conduction in either direction between its primary electrodes $f$ when a voltage of either polarity is applied to its gate electrode $g$. An equivalent network is two silicon controlled rectifiers connected in parallel in opposite polarity. Other bidirectional electron valves triggered externally or internally may be substituted. The triac is triggered by a diac D1 (G.E., type ST2), similar to the triac but lacking a gate electrode. A diac breaks down to avalanche conduction when the voltage across it exceeds a predetermined value. A diac may be replaced by two avalanche diodes connected in parallel. The diac D1 is connected between the triac gate $g$ and the junction $j$ of a resistor R1 (100 kilohms) and a capacitor C2 (0.1 microfarad) connected in parallel with the triac V1.

The transformer T1–T2 is incapable of stepping up the line voltage, e.g., 115 volts, RMS, 162 volts peak to the arc starting voltage level of the lamp, and the standard line voltage for which the lamp is rated is less than the arc starting voltage. Further, the inductive reactance of the pulse transformer is far less (e.g., 0.250 henry) than the inductance usually required to limit the current in the negative resistance lamp and prevent runaway operation (e.g., 1.2 henries). Nevertheless, the circuit starts the lamp arc and limits its current in the following mode of operation.

At the beginning, time $t_0$ (FIG. 9), of each half cycle of line voltage at terminals A and C the line voltage 9A rises, charging capacitor C2. At time $t_1$ in the half cycle the voltage across capacitor C2 exceeds the breakdown voltage E1 of the switch D1, allowing the capacitor C2 to discharge to the gate electrode $g$ of the valve V1, and trigger the triac V1 (voltage waveform 9B). As shown by voltage waveform 9C the primary capacitor C1, charged from a previous cycle, discharges and reverses its charge to the instantaneous line voltage through the valve (FIG. 9C). The capacitor thereby discharges a voltage pulse or oscillatory pulse train through the transformer primary T1. This discharge voltage is stepped up in the transformer secondary T2 of the lamp 1, and the stepped up voltage pulse or train is applied to the lamp terminals 2. At this instant a limited number of ions are established in the lamp depending on the amplitude and duration of the pulse (waveform 9D). Shortly thereafter, at time $t_3$, the lamp fully ignites and conducts line current for part or all of the remaining half cycle (waveform 9E). At time $t_4$, either before or shortly after the half cycle when the line voltage again passes through zero, the arc almost extinguishes since the limited ionization cannot maintain the arc until the line voltage rises in the subsequent half cycle to arc maintaining voltage level.

With a conventional ballast, once the arc is ignited by one or more initial inductive kicks and the lamp attains its negative resistance condition, the excess ionization provided by the ballasts allows the line voltage to carry the lamp through successive half cycles of conduction without applying higher arc starting voltage. In fact the ballast is necessary to prevent runaway conduction. In contrast the present pulse generating circuit injects an ionizing voltage pulse each half cycle. Failure of the pulse generating circuit to re-ionize the lamp each half cycle would immediately or quickly result in extinction of the arc. Thus, with rare exceptions, the generating circuit applies an arc starting voltage to the lamp once each half cycle of line voltage. On the other hand, the values of the generating circuit components are selected to limit the degree of ionization to that just necessary to support about one half cycle of conduction at line voltage. By thus limiting the amount of ions available to conduct current at the lower line voltage the lamp tends to, and almost does, extinguish each half cycle as the alternating line voltage passes through zero. With this ionization control the lamp is prevented from progressing to runaway conduction condition. The pulse generating circuit thus eliminates the conventional heavy ballast, but with a new mode of operation provides the arc starting and current limiting functions of such a ballast. The prior heavy ballast (e.g., ten pounds) is replaced by a significantly lighter autotransformer (e.g., three pounds) whose much lower inductance draws a small fraction of the power drawn by a conventional ballast.

In the mode of operation described above the average current drawn by the lamp each half cycle depends on the amount of ionization injected in the lamp by the primary storage capacitor C1. This in turn depends on the amplitude to which the line voltage has risen at the time the valve T is triggered by breakdown of the switch device D. The earlier the breakdown and triggering, the lower the instantaneous line voltage, and the less the ionization and average current in the lamp. In the circuit of FIG. 1 the number of ions, the series reactance of the choke-transformer 3, and the line voltage control the average current through the lamp. These factors can be chosen to represent the proper lamp circuit.

In the circuit of FIG. 1 the components, particularly the diac D1, are selected such that the diac fires early in the line voltage cycle, e.g., at about 25° or 70 volts. Triggered at this time the main capacitor C1 ionizes the lamp insufficiently to allow runaway conduction.

In FIGS. 2 to 8 components common to those of FIG. 1 are similarly numbered or lettered.

Figure 2:
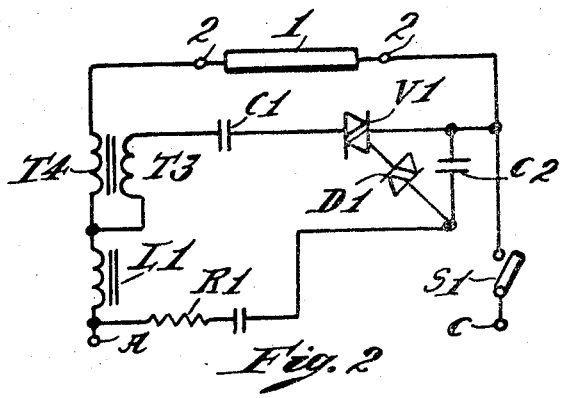

FIG. 2 illustrates an alternate way of coupling the discharge of the main storage capacitor C1 to the lamp 1 through a transformer whose primary T3 is parallel to rather than in series with the power circuit through the lamp. The transformer secondary T4, which may have a turns ratio of 10 to 1 in the primary, has negligible inductance. Primarily to improve the stability of the circuit a small choke L1 may be included in the power circuit. Such a choke has a small fraction of the inductance of a conventional ballast and is inadequate to limit current through the lamp. Arc starting and current limiting is achieved as described with reference to FIG. 1.

FIG. 2 also shows that the diac D1 may be connected to terminal A rather than to one of the primary current discharge electrodes $f$ of the triac V1. Such a connection has the advantage that the voltage applied to the diac is independent of the charging time constant of triac V1 and primary capacitor C1, and the amplitude of the previous discharge of capacitor C1. Such a connection of the diac to the power terminal may be made in the circuits of FIGS. 1, 3, 6 and 7.

Figure 3:
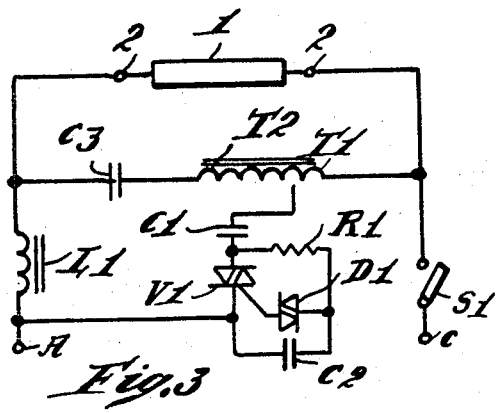

In FIG. 3 the primary T1 and secondary T2 of the autotransformer of FIG. 1 are entirely in the pulse generating circuit parallel to the lamp 1. A blocking capacitor C3 (0.4 microfarad) prevents the autotransformer from shunting the lamp. A small stabilizing choke L1, like that of FIG. 2 is connected between the line terminal A and a lamp terminal 2. Firing of the triac V1 discharges the storage capacitor C1 through the primary T1 causing the secondary to apply a stepped up voltage pulse to the lamp as in the mode of operation of FIG. 1.

Figure 4:
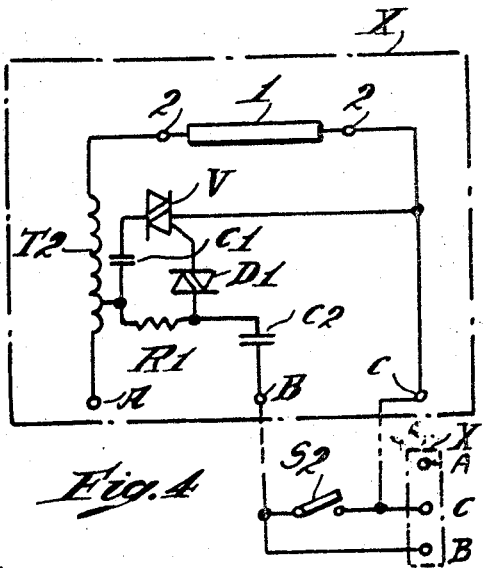
Figure 5:
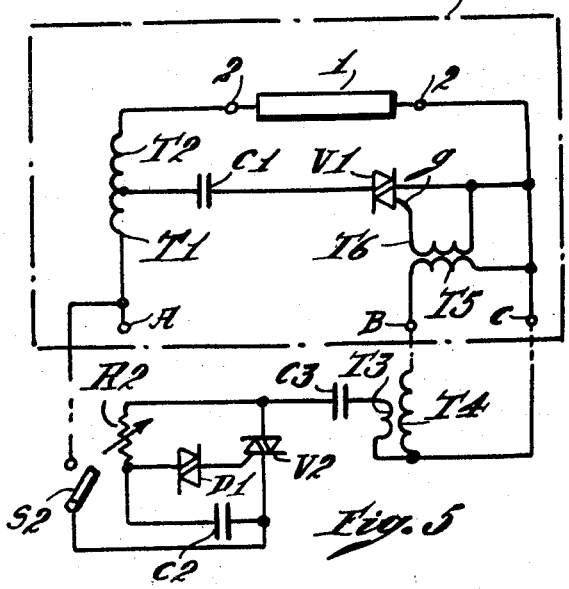

FIGS. 4 and 5 illustrate two ways in which the lamp circuit may be energized by a switch S2 remote from the fixture X in which the lamp and control circuit are mounted. In FIG. 4 the remote switch S2, through a terminal B, connects the trigger capacitor C2 to the line terminal C. Until this connection is made the diac D1 and triac V1 cannot be fired and the power circuit between terminals A and C draws no current. When switch S2 is closed the trigger capacitor C2 charges with each half cycle to the breakdown voltage of the diac D1 and the pulse generating circuit functions exactly as in FIG. 1. Because only a small fraction of the line current (e.g., less than two milliamperes) is drawn by the trigger capacitor C2, and because the voltage across the remote switch is a fraction of line voltage, wires of very low current rating (two milliamperes) may be used with safety. Such low current rated wiring represents a substantial saving in cost of installation, particularly when two or more fixtures X are controlled by the same remote switch, as shown in FIG. 4.

In FIG. 5 not only the starting switch S2 but also a trigger circuit for the triac V1 are remote from the lamp fixture X. The remote trigger circuit comprises a triac V2 which valves the charge and discharge of a 1 microfarad storage capacitor C3. The trigger capacitor C2 and diac D1 are the same as in FIG. 1. The resistor R2 in the trigger circuit is variable from zero to 100 kilohms. The storage capacitor C3 discharges into the primary T3 of a step-up transformer like that of FIG. 2. The secondary T4 of the stepup transformer T3–T4 is connected through a fixture terminal B to a 1:1 transformer T5–T6 connected to the gate electrode $g$ of the pulse discharging triac V1. Closing the remote switch S2 allows the trigger capacitor C2 to charge at a rate determined by its capacitance (0.1 microfarad) and the resistance setting of resistor R2. The capacitor C2 triggers the diode D1 and triac V2 as in the circuit of FIG. 1. When triac V2 fires, the storage capacitor C3 discharges through the transformer T3–T4 firing the pulse generating triac V1. As explained with reference to FIG. 1 the average current through the lamp depends on the number of ions produced by each starting pulse, which in turn depends on the amplitude of the line voltage at the instant the pulsing capacitor C1 reverses charge. Lowering the value of the variable resistor R2 allows the trigger capacitor C2 to break down at an earlier and lower voltage amplitude of line voltage, producing fewer ions in the lamp 1 and reducing its average current and light output. The light may thus be continuously varied from dim to full intensity by adjusting the resistor R2 at the remote switch location.

Figure 6:
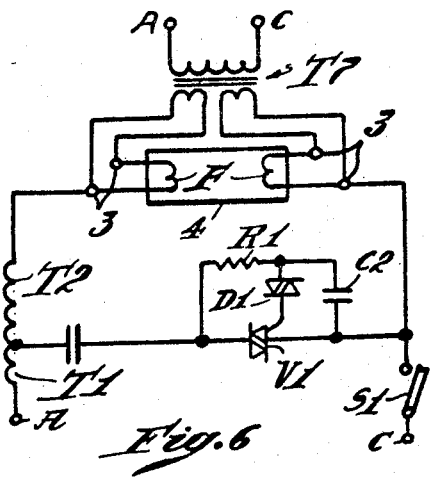

FIG. 6 shows a circuit exactly like that of FIG. 1 with the addition of a transformer T7 whose secondary supplies heating current through filament terminals 3 of a rapid start lamp 4 having filaments F.

In FIG. 7 the separate filament transformer of FIG. 6 is omitted and three filament windings of negligible inductance T9 are provided on the autotransformer T1–T2 of FIG. 1. These low voltage windings are connected through filament terminals 3 to two 60 watt rapid start lamps 4 in series. The pulse generating circuit of FIG. 1 (capacitor C1, triac V1, diac D1, resistor R1 and capacitor C2) is modified by a start switch S4 in series with capacitor C2, and by a normally closed thermostatic switch S3 and a 50 ohm resistor R3 in series shunting the pulse capacitor C1. The thermostatic switch is operated by a heating element H connected in parallel with one pair of filament terminals 3.

The transformer T1–T2, having a turns ratio of 168:332, steps up the capacitor starting pulse as well as providing filament current. When the start switch S4 is closed, the capacitor C1, being shunted, does not charge and discharge pulses. Instead the triac V1 is triggered into conduction early in each line voltage half cycle and thereafter allows the transformer primary T1 to follow the line voltage to the end of each half cycle. Nearly sinusoidal current is thereby applied to the filaments F of the lamps, heating them to emissive state. During this filament heating period the heater H1 is also heated at the same rate, the thermostatic switch S3 being adjusted to respond by opening when the filaments are emissive. No longer shunted, capacitor C1 performs its pulse generating function as in the circuit of FIG. 1. Thus lamp current is not drawn until the low voltage current has heated the filaments to emission.

FIG. 8 shows a control system for two, sixty watt, high output fluorescent lamps 6. As previously described with reference to FIG. 1 the average current through the lamps is limited by selecting pulse generating component values. But line voltage changes or changes in lamp characteristics due to temperature changes may cause the lamp current to change. HO lamps go through radical changes during their warmup for instance. The circuit of FIG. 8 will regulate the average current by regulating the starting voltage pulse.

The regulation circuit employs a unijunction transistor V2 as a trigger for the triac T1. The UJT is coupled to the triac by a pulse transformer L3–L4 and rectified current for its bases is supplied by diodes D2 and D3. The UJT is selected for its low specific firing voltage and lower current drain as compared with a diac. The firing voltage is applied to the unijunction by an RC network comprising a thermistor R$t$ and a 0.22 microfarad capacitor C4 whose charging rate is dependent on its own value and the temperature dependent resistance of the thermistor. The thermistor has a resistance of about 5 to 50 kilohms in the temperature range of an integral heater H2 in series with the lamps. Normal lamp current through the heater will adjust the thermistor resistance to about 8.5 kilohms. Should the lamp current increase, the filament F heats and lowers the resistance R$t$, increasing the charging rate of C3 and firing the UJT earlier in the half cycle. This reduces the energy in the pulse, lowering the current in the lamp and compensating its tendency to increase.

From the foregoing description it can be seen that the present circuits provide a far less bulky, less costly and quieter control system for arc discharge devices such as fluorescent lamps, and provide temperature regulation, low voltage remote switch and dimming, while affording quick arc ignition and current limiting hitherto accomplished only with the use of expensive and hot operating ballasts. These advantages, particularly the quieter operation, are made possible by the great reduction of iron in the stepup transformer.

It should be understood that the present disclosure is for the purpose of illustration only and that this invention includes all modifications and equivalents which fall within the scope of the appended claims.

I claim:

1. An electrical system for continuously controlling operation of a negative resistance ionized arc discharge device having a predetermined arc maintaining voltage level comprising discharge terminals for connection to each end of the device, power terminals for connection to a supply of alternating voltage less than said predetermined arc maintaining level, a power circuit continuously connecting said power terminals to said discharge terminals and including substantially less inductance than that required to limit current through the discharge device, a voltage pulse generating circuit connected in parallel with said discharge terminals and in series with said power terminals, said pulse generating circuit including a storage capacitor and bidirectional controlled valve means in series with each other and in parallel with the lamp, and a breakdown network coupled to said valve means to control conduction of the valve means, said network being continuously coupled to said power terminals to break down once each half cycle of the alternating current independently of the state of conduction of the discharge device, and said valve means being responsive to said network to discharge a voltage pulse from said storage capacitor once each half cycle of alternation, and means coupling said storage capacitor to said discharge terminals, said capacitor having a storage capacity of energy sufficient to produce ionization in the device adequate to support substantially one half cycle of conduction, thereby to start an arc discharge by ionization in said device and to draw current from said alternating voltage supply, said generating circuit including means to limit the energy of each voltage pulse to less than that required to ionize the device through successive half cycles, whereby the arc tends to extinguish and is reionized each half cycle thereby to limit current through the device without the use of a ballast.

2. A system according to claim 1 wherein said pulse generating circuit is inductively coupled to said power circuit by a transformer.

3. A system according to claim 1 wherein said pulse generating circuit is triggered by a switching device remote from said generating circuit and responsive to said voltage supply to trigger said generating circuit once each half cycle of said voltage supply.

4. A system according to claim 1 wherein said pulse generating circuit comprises time constant means including a variable resistance for controlling the energy of each voltage pulse and hence the average current drawn by said device.

5. A circuit according to claim 4 wherein said pulse generating circuit comprises a triggered pulse discharge valve, and characterized by a switching device connected between a power terminal and said valve and actuated by a predetermined voltage to trigger said valve, said time constant means controlling the time in the alternating voltage cycle at which said predetermined voltage actuates the switching device.

6. A system according to claim 1 wherein said pulse generating circuit includes time constant means for varying the energy of said voltage pulse, and means for sensing current in said power circuit, said time constant means being responsive to a current increase sensed by said sensing means to reduce the energy of each voltage pulse thereby to reduce current through said device.

7. A system according to claim 2 wherein said transformer includes a primary winding in said power circuit, a secondary winding connected to filament terminals for said device, and characterized by means for sensing current through said filament terminals, and means responsive to said sensing means to enable said pulse generating circuit.

8. A circuit according to claim 6 wherein said sensing means comprises an ohmic radiation emitter coupled to said power terminals and a radiation sensitive device changing resistance in response to changes in radiation from said emitter, and wherein said pulse generating circuit comprises time constant means including said sensitive device for controlling the energy of each voltage pulse and hence the average current drawn by said discharge device.

9. A circuit according to claim 8 wherein said radiation emitter is connected in series with said discharge device.

10. A circuit according to claim 8 wherein said pulse generating circuit comprises a triggered pulse discharge valve, and characterized by a switching device connected between a power terminal and said valve and actuated by a predetermined voltage to trigger said valve, said time constant means controlling the time in the alternating voltage cycle at which said predetermined voltage actuates the switching device.

11. A circuit according to claim 1 wherein said pulse generating circuit includes a controllable bidirectional electron valve in parallel with said lamp terminals, and a switching device responsive to said voltage supply to trigger said valve over each half-cycle of said voltage supply.

12. A circuit according to claim 11 wherein said electron valve has a control electrode and characterized in that said switching device comprises a breakdown electron valve having one electrode connected to said control electrode and a second electrode connected to one of said power terminals.

13. A circuit according to claim 11 wherein said electron valve has a control electrode and primary current discharge electrodes, and characterized by a storage capacitor connected in series with said primary terminal, and a trigger device having one electrode connected to said control electrode and a second electrode capacitively coupled to one of said power terminals.

References Cited
UNITED STATES PATENTS

| | | | |
|---|---|---|---|
| 2,856,563 | 10/1958 | Rively | 315—290 X |
| 3,170,085 | 2/1965 | Genuit | 315—273 X |
| 3,235,769 | 2/1966 | Wattenbach | 315—176 |
| 3,259,797 | 7/1966 | Heine et al. | 315—174 |

JAMES W. LAWRENCE, Primary Examiner

C. R. CAMPBELL, Assistant Examiner

U.S. Cl. X.R.

307—305; 315—180, 206, 272, 280, 289